(12) United States Patent
Paz

(10) Patent No.: US 9,967,470 B2
(45) Date of Patent: May 8, 2018

(54) AUTOMATED CAMERA TRACKING SYSTEM FOR TRACKING OBJECTS

(71) Applicant: Panhandle Bugeaters, LLC, Littleton, CO (US)

(72) Inventor: Bradley Paz, Littleton, CO (US)

(73) Assignee: ZOPTIC, LLC, Littleton, CO (US)

( * ) Notice: Subject to any disclaimer, the term of this patent is extended or adjusted under 35 U.S.C. 154(b) by 301 days.

(21) Appl. No.: 14/713,705

(22) Filed: May 15, 2015

(65) Prior Publication Data

US 2015/0334311 A1    Nov. 19, 2015

Related U.S. Application Data

(63) Continuation of application No. 14/120,285, filed on May 15, 2014, now abandoned.

(51) Int. Cl.
| | | |
|---|---|---|
| *H04N 5/225* | (2006.01) | |
| *H04N 5/232* | (2006.01) | |
| *G01S 3/786* | (2006.01) | |
| *H04N 7/18* | (2006.01) | |
| *H04N 1/00* | (2006.01) | |
| *H04N 5/222* | (2006.01) | |

(52) U.S. Cl.
CPC ......... *H04N 5/23296* (2013.01); *G01S 3/786* (2013.01); *G01S 3/7864* (2013.01); *H04N 1/00307* (2013.01); *H04N 5/2228* (2013.01); *H04N 5/232* (2013.01); *H04N 5/23203* (2013.01); *H04N 7/18* (2013.01); *H04N 7/185* (2013.01); *G01S 2205/00* (2013.01)

(58) Field of Classification Search
CPC .... G01S 2205/00; G01S 3/786; G01S 3/7864; H04N 1/00307; H04N 5/2228; H04N 5/232; H04N 5/23203; H04N 5/23296; H04N 7/18; H04N 7/185
See application file for complete search history.

(56) References Cited

U.S. PATENT DOCUMENTS

| | | | | |
|---|---|---|---|---|
| 9,495,759 | B2 * | 11/2016 | DeMartin | ........ G08B 13/19602 |
| 2012/0157116 | A1 * | 6/2012 | Karlsson | ................. G01S 11/06 455/456.1 |
| 2015/0109457 | A1 * | 4/2015 | Stout | ..................... H04N 5/222 348/169 |
| 2017/0132795 | A1 * | 5/2017 | DeMartin | ................. G06T 7/20 |

* cited by examiner

Primary Examiner — Jessica M Prince
(74) *Attorney, Agent, or Firm* — Sheridan Ross P.C.

(57) ABSTRACT

A camera tracking system allows a camera to lock onto and follow a target object dynamically and automatically, without direct human intervention, including when the object moves erratically or unpredictably.

18 Claims, 5 Drawing Sheets

AUTOMATED CAMERA TRACKING SYSTEM FOR TRACKING OBJECTS

CROSS-REFERENCE TO RELATED APPLICATION

This application is a continuation-in-part of application Ser. No. 14/120,285, filed 15 May 2014, the entirety of which is hereby incorporated by reference.

FIELD

The disclosure relates to systems and methods that allow a camera to continuously follow or track a moving object, and in particular to systems and methods including wearable tracking devices that enable the camera to follow an object wearing the wearable device.

DESCRIPTION OF THE RELATED ART

One of the challenges in video recording of live events is the difficulty of following an object, in many cases a person, which may move erratically or unpredictably. By way of non-limiting example, it is often desired in recording or broadcasting sporting events to follow or track a particular athlete, whose movements are not known in advance and often may be unpredictable to the camera operator. When the camera is operated manually by a human user, there is thus a significant time lag between the target object's movements and the movement of the camera following the target object. As a result, the target object may not always be in the image frame, or in the center of the image frame. In addition, a human camera operator may attempt to compensate for the time lag by moving the camera in a rapid or uneven fashion, which can be distracting and disorienting to the viewer. Moreover, following a continuously moving object for a significant, uninterrupted length of time can be taxing on the human camera operator. It is thus desirable to be able to direct the camera to follow the target object automatically, without direct human intervention.

Means for determining three-dimensional coordinates of an object, e.g. along an X axis, a Y axis, and a Z axis, are known and described in the art. For example, U.S. Pat. No. 6,061,644 to Leis ("Leis") discloses and claims a system for determining the spatial position and orientation of each of a plurality of bodies, comprising at least three markers affixed to each one of the bodies in a predetermined, relative geometric relationship. The markers of Leis respond to an activation signal by emitting energy, which is then detected by an energy detector and compared against the predetermined geometric relationship between the markers. Because the system of Leis requires multiple markers arranged in a precise geometric pattern, it is poorly suited for tracking objects which move rapidly or erratically and thus may be prone to disrupting the marker pattern. The multiple markers also add weight and cost to the system. Moreover, the embodiments disclosed by Leis use infrared light for communication between the markers and the energy detector and therefore require an unobstructed line of sight between the markers and the detector, making the system of Leis unsuitable for situations in which the target object may, for example, abruptly move behind another object.

Imaging systems which locate, recognize, follow, or track an object are also known and described in the art. For example, U.S. Pat. No. 8,638,375 to Amor Molares et al. ("Amor Molares") discloses and claims an integrated field-portable device comprising an image capture device configured to capture an image of a survey target area and a position determination system for determining a position of the integrated field-portable device. The system of Amor Molares is directed to identifying the positions of objects, particularly orbiting satellites, whose movement paths are well known relative to the geographic position of the camera itself, and so would not be useful for analyzing the unpredictable movement of a much smaller object and directing a camera accordingly. The target objects of the Amor Molares system do not communicate their positions to the system in real time, and so the system cannot account for deviations from a presumed movement path.

SUMMARY

There is a need in the art for a camera tracking system that allows a camera to lock onto and follow a target object, and that overcomes the limitations of the prior art, including but not limited to those discussed above.

The present disclosure relates to a system that allows a camera to lock onto and follow a target object dynamically and automatically, without direct human intervention, including when the object moves unpredictably. The system can automatically correct for errors in positioning that accrue during operation. The system comprises a wearable tracking device which collects and communicates position data; a camera with wireless communication capability; and a communications module, which allows a user to monitor and operate the system remotely.

The present disclosure provides a camera tracking system, comprising a camera module; a communications module; and a tracking module, disposed on or within a target object. The camera module comprises a camera; at least one motor, controlling an orientation of the camera; and a camera controller with a wireless communication interface, controlling the at least one motor. The communications module comprises an application for a smartphone, the application allowing a user of the system to initialize, activate, and deactivate the system. The tracking module comprises a coordinate determination device, measuring one or more quantities of the tracking module with respect to each of at least two axes at regular time intervals, at least one of the quantities being selected from the group of position, velocity, and acceleration; a tracking controller with a wireless communication interface, transmitting coordinate information to the camera controller via a wireless signal, the coordinate information comprising the quantities measured by the coordinate determination device; and a rechargeable battery, powering the coordinate determination device and the tracking controller. The camera controller converts the coordinate information into target coordinates and commands the servo motors to reorient the camera such that the camera remains focused on the target coordinates at all times during operation of the system.

In embodiments, the camera controller transmits images captured by the camera to the smartphone, and the application allows the user to view the images in real time.

In embodiments, the application monitors a signal strength of the wireless signal.

In embodiments, the tracking module is part of a wearable worn by the target object.

In embodiments, the application reminds the user to re-initialize the system at preselected time intervals.

In embodiments, the tracking microcontroller transmits a beacon signal at least at preselected time intervals. In an embodiment, the beacon signal is at least one of a light signal and a sound signal. In another embodiment, the system is re-initialized when the camera microcontroller detects the beacon signal. In another embodiment, the tracking microcontroller transmits the beacon continuously.

In embodiments, the system further comprises a second tracking module, wherein the quantities measured by the coordinate determination devices of each of the tracking modules comprise both absolute quantities and quantities relative to the other tracking module.

In embodiments, the coordinate determination device comprises an accelerometer and at least one of the quantities is acceleration.

In embodiments, the coordinate determination device comprises a magnetometer and measures at least one of the quantities relative to a reference direction of the magnetometer.

In embodiments, the coordinate determination device measures the quantities with respect to a first axis and a second axis only, and the target coordinates comprise a preselected fixed value along a third axis.

In embodiments, the tracking module is disposed within, or on the surface of, a game projectile.

The disclosure also provides a method for continuously tracking an object with a camera, comprising disposing a tracking target on or within the object, the tracking target comprising an accelerometer and a wireless transmitter; defining a Cartesian coordinate system having three dimensions x, y, z; defining a position $(x_0, y_0, z_0)$ of the tracking target at a start time $t_0$ as an origin $(0, 0, 0)$ of the coordinate system; the accelerometer measuring, at n time intervals after $t_0$, an acceleration along each of the three dimensions $a_{x,n}$, $a_{y,n}$, $a_{z,n}$, of the tracking target relative to the origin, each time interval having a preselected length $t_{int}$; the wireless transmitter transmitting the accelerations $a_{x,n}$, $a_{y,n}$, $a_{z,n}$ to a microcontroller associated with the camera; the microcontroller calculating, for each time interval, a velocity along each of the three dimensions $v_{x,n}$, $v_{y,n}$, $v_{z,n}$ of the tracking target relative to the origin; the microcontroller calculating, for each time interval, a coordinate position $(x_n, y_n, z_n)$ of the tracking target; and the microcontroller commanding, for each time interval, at least one servo motor controlling an orientation of the camera to reorient the camera such that the camera is focused on the coordinate position of the tracking target. The microcontroller calculates the velocities $v_{x,n}$, $v_{y,n}$, $v_{z,n}$ of the tracking target relative to the origin according to the equations:

$$v_{x,n} = v_{x,n-1} + a_{x,n} t_{int}$$

$$v_{y,n} = v_{y,n-1} + a_{y,n} t_{int}$$

$$v_{z,n} = v_{z,n-1} + a_{z,n} t_{int}$$

The microcontroller calculates the coordinate position $(x_n, y_n, z_n)$ of the tracking target according to the equations:

$$x_n = x_{n-1} + v_{x,n} t_{int} + \frac{a_{x,n} t_{int}^2}{2}$$

$$y_n = y_{n-1} + v_{y,n} t_{int} + \frac{a_{y,n} t_{int}^2}{2}$$

$$z_n = z_{n-1} + v_{z,n} t_{int} + \frac{a_{z,n} t_{int}^2}{2}$$

In embodiments, $t_{int}$ is between about 0.5 milliseconds and about 1/24 second.

In embodiments, the method further comprises redefining the origin after a preselected number of time intervals. In an embodiment, the step of redefining the origin is accomplished by the tracking target emitting a beacon signal after the preselected number of time intervals and the microcontroller detecting the beacon signal and defining the origin as the coordinate position of the tracking target when the tracking target emitted the beacon signal, the beacon signal comprising at least one of a light signal and a sound signal.

In embodiments, the tracking target is part of a wearable worn by the target object.

In embodiments, the object is a game projectile.

These and other advantages will be apparent from the disclosure contained herein.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the disclosure are possible utilizing, alone or in combination, one or more of the features set forth above or described in detail below.

DETAILED DESCRIPTION OF THE INVENTION

As used herein, the term "game projectile" means a ball, missile, or any other such body which occupies physical space and can be touched and thereby felt, i.e. a tangible body, which a player or participant in a game or sport throws, rolls, shoves, impels, propels, projects, or otherwise puts into motion, so as to achieve an objective set forth by the rules of the game or sport. Examples of "game projectiles" as that term is used herein include, but are not limited to, arrows, baseballs and softballs, basketballs, billiard balls, boomerangs, bowling balls, cricket balls, croquet balls, curling stones, darts, discuses, balls for use in various types of football, golf balls, hockey pucks, horseshoes, javelins, lacrosse balls, racquetballs, shots, shuttlecocks, squash balls, table tennis balls, tennis balls, and volleyballs. It should also be appreciated that the term "game projectile" can be used to refer to projectiles or bodies not involved in games. For instance, a stage actor, prop, or other movable object may also be considered a "game projectile."

Figure 1:
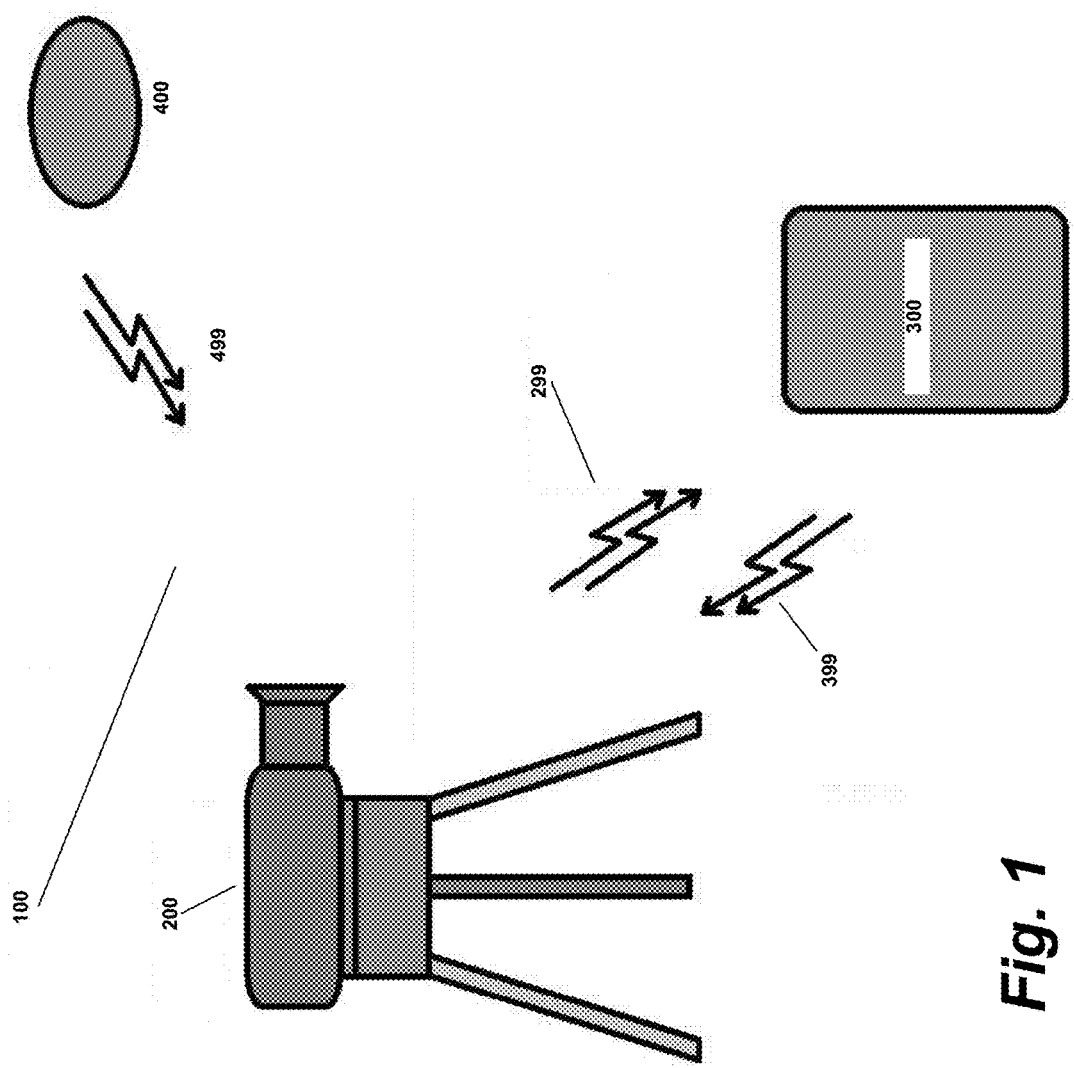
FIG. 1 is a block diagram of a general configuration of a camera tracking system according to embodiments of the present disclosure.

Referring now to FIG. 1, a camera tracking system 100 comprises a camera module 200, a communications module 300, and a tracking module 400. The tracking module 400 wirelessly transmits a coordinate information signal 499 to the camera module 200. The coordinate information signal 499 comprises data identifying a location of the tracking module 400 and may be of any suitable type and frequency. By way of non-limiting example, the coordinate information signal 499 may be a Bluetooth signal, a HiperLAN signal, a Wi-Fi or other IEEE 802.11-compliant signal, or a ZigBee or other IEEE 802.15.4-compliant signal. By way of non-limiting example, the coordinate information signal 499 may have a frequency of between about 902 MHz and about 928 MHz, between about 2.400 GHz and about 2.500 GHz, between about 5.725 GHz and 5.875 GHz, or another ISM band frequency. The camera module 200 wirelessly transmits a camera module signal 299 to the communications module 300. The camera module signal 299 may be of any suitable type and frequency. By way of non-limiting example, the camera module signal 299 may be a Bluetooth signal, a HiperLAN signal, a Wi-Fi or other IEEE 802.11-compliant signal, a ZigBee or other IEEE 802.15.4-compliant signal, or a GSM signal. By way of non-limiting example, the camera module signal 299 may have a frequency of between about 902.0 MHz and about 928.0 MHz, between about 2.4000 GHz and about 2.5000 GHz, between about 5.7250 GHz and 5.8750 GHz, between about 869.2 MHz and about 893.8 MHz, between about 925.0 MHZ and about 960.0 MHz, between about 1.8052 GHz and about 1.8798 GHz, between about 1.9302 GHz and about 1.9898 GHZ, another ISM band frequency, or another GSM band frequency. The communications module 300 wirelessly transmits a control signal 399 to the camera module 200. The control signal 399 allows a user to control the camera tracking system 100 and may, by way of non-limiting example, comprise commands from the user to the camera module 200 to initialize, activate, or deactivate the camera tracking system 100. The control signal 399 may be of any suitable type and frequency. By way of non-limiting example, the control signal 399 may be a Bluetooth signal, a HiperLAN signal, a Wi-Fi or other IEEE 802.11-compliant signal, a ZigBee or other IEEE 802.15.4-compliant signal, or a GSM signal. By way of non-limiting example, the control signal 399 may have a frequency of between about 902.0 MHz and about 928.0 MHz, between about 2.4000 GHz and about 2.5000 GHz, between about 5.7250 GHz and 5.8750 GHz, between about 869.2 MHz and about 893.8 MHz, between about 925.0 MHZ and about 960.0 MHz, between about 1.8052 GHz and about 1.8798 GHz, between about 1.9302 GHz and about 1.9898 GHZ, another ISM band frequency, or another GSM band frequency. The camera module 200 interprets the coordinate information signal 499 and reorients accordingly, such that the camera module 200 remains oriented toward the tracking module 400 at all times during operation of the camera tracking system 100, even when a direct line of sight between the camera module 200 and the tracking module 400 is obstructed. Thus, images or video captured by the camera module 200 will always keep the tracking module 400 in view.

Figure 2:
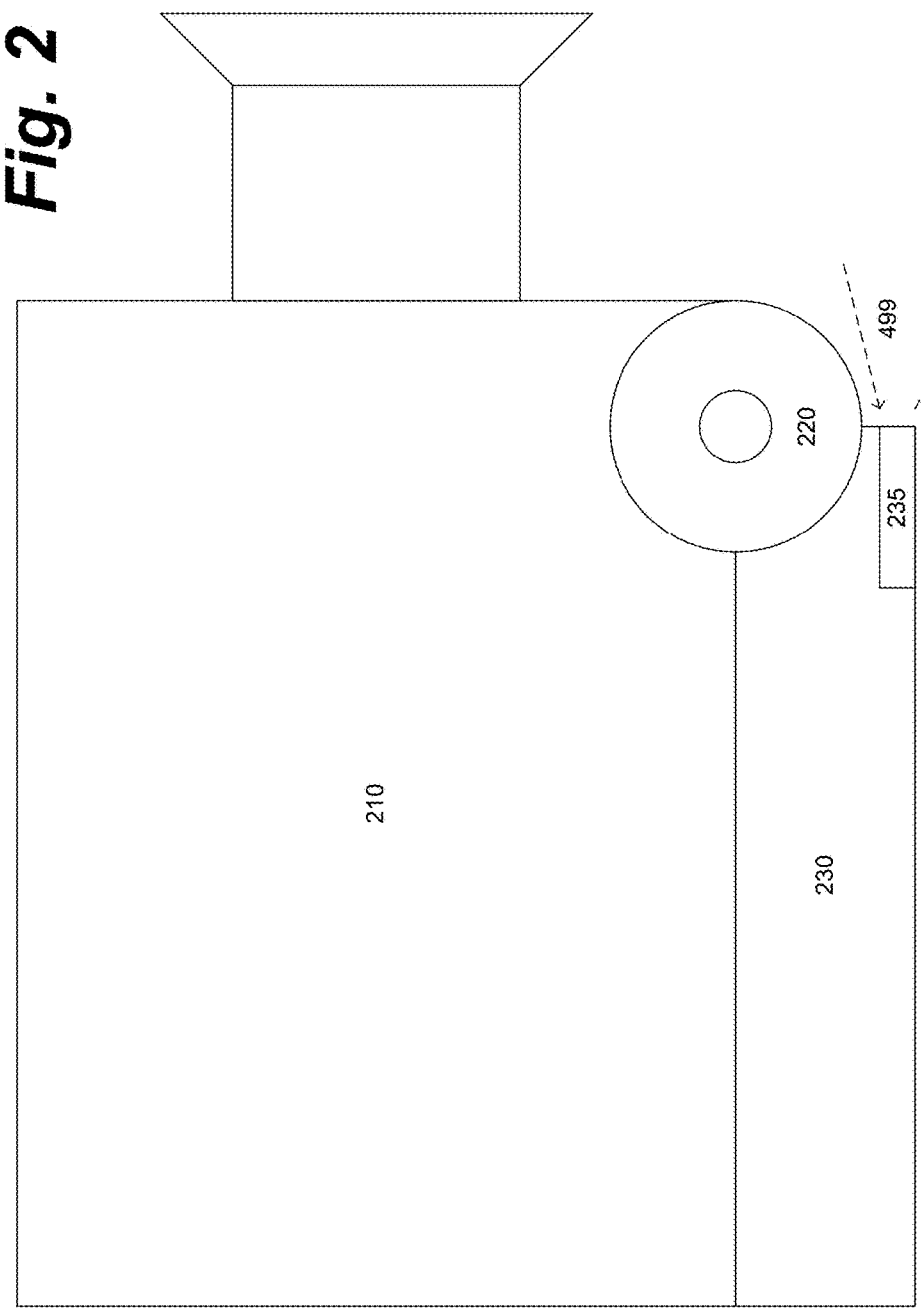
FIG. 2 is a block diagram of a camera module of the camera tracking system illustrated in FIG. 1.

Referring now to FIG. 2, the camera module 200 comprises a camera 210, at least one servo motor 220, and a camera microcontroller 230 with a wireless communication interface 235. The camera microcontroller 230 controls the servo motor 220, which in turn controls the orientation of the camera 210. The camera microcontroller 230 receives the coordinate information signal 499 via the wireless communication interface 235, converts the coordinate information into target coordinates, and commands the servo motor 220 to reorient the camera 210 such that the camera 210 remains focused on the target coordinates at all times during operation of the camera tracking system 100. In embodiments, the camera microcontroller 230 may receive coordinate information signals 499 from multiple tracking modules 400 simultaneously and, by comparing the coordinate information signals 499 against each other, more accurately calculate the target coordinates for a particular tracking module 400. In further embodiments, the camera microcontroller 230 may calculate target coordinates in two dimensions only, e.g. along an X axis and a Y axis, and define a target coordinate in a third dimension, e.g. along a Z axis, as a preselected fixed value, thereby defining a fixed plane along which only two coordinates are changed. In these embodiments, the camera microcontroller 230 may constrain the servo motor 220 to reorient the camera 210 along two axes only, such that the camera 210 remains focused at all times on points defining a plane corresponding to the fixed value along a third axis.

Figure 3:
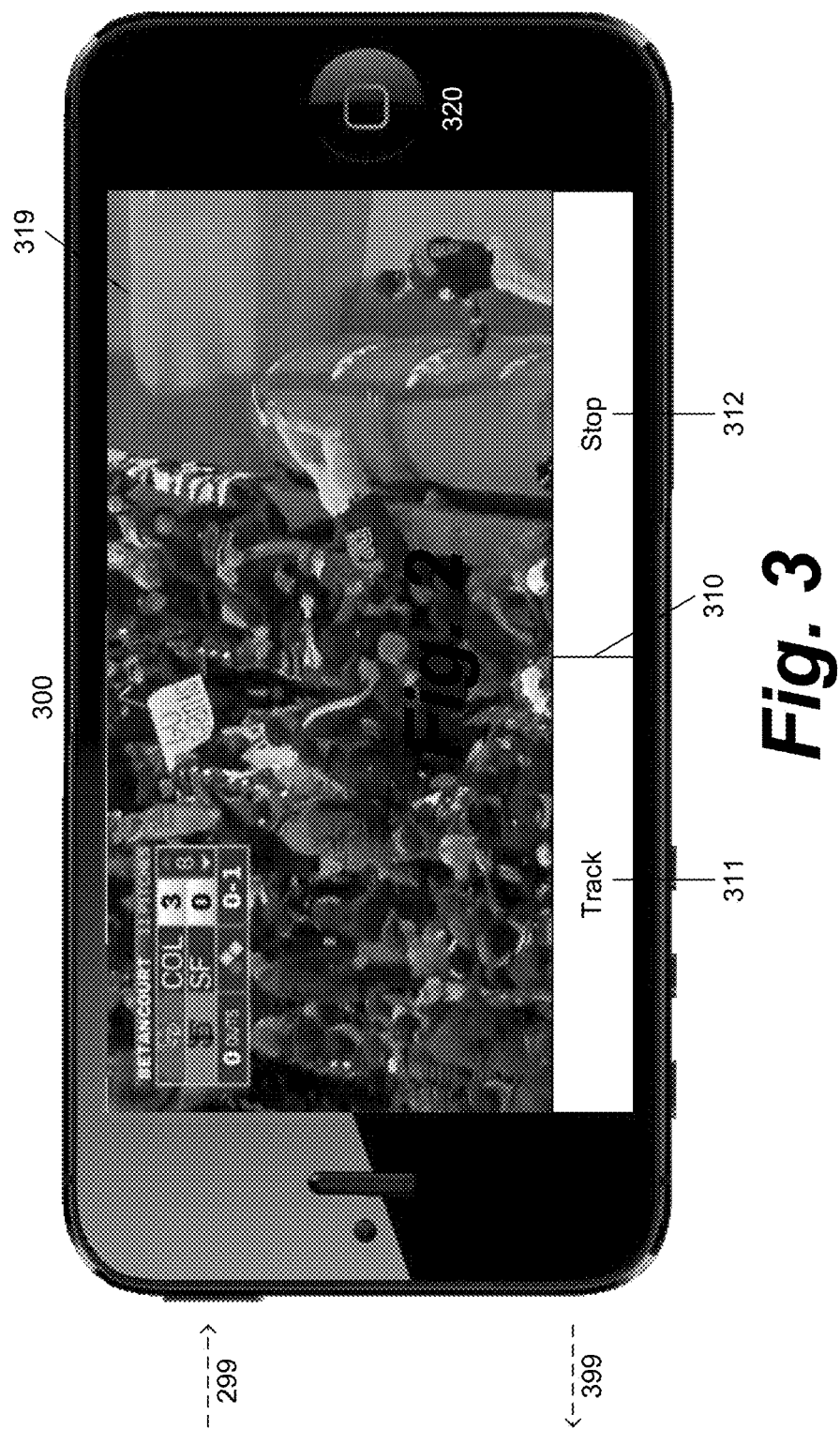
FIG. 3 is a block diagram of a communications module of the camera tracking system illustrated in FIG. 1.

Referring now to FIG. 3, the communications module 300 comprises an application 310 for a smartphone 320, which may be, by way of non-limiting example, an iPhone or an Android device. The application 310 allows the user to input commands to initialize, activate, or deactivate the camera tracking system 100; the user's commands are transmitted by the smartphone 320 to the wireless communication interface 235 of the camera module 200 via the control signal 399. In the embodiment illustrated in FIG. 3, the application 310 comprises a "Track" button 311, which the user may push to initialize and activate the camera tracking system 100, and a "Stop" button 312, which the user may push to deactivate the camera tracking system 100. In this embodiment, the application 310 is displaying the video 319 captured by the camera 210, which the smartphone 320 receives from the wireless communication interface 235 of the camera module 200 via the camera module signal 299. In embodiments, the application 310 may also monitor the strength of one or more of the camera module signal 299, the control signal 399, and the coordinate information signal 499. In further embodiments, the application 310 may remind the user to re-initialize the camera tracking system 100 at preselected time intervals to eliminate accumulated error in the target coordinates calculated by the camera microcontroller 230. Alternatively or additionally, the application 310 may determine that the accumulated error in the target coordinates has exceeded a predetermined threshold (e.g., by determining that a beacon transmitted by the tracking device is not being captured by the camera module 200) in which case the application 310 may prompt the user thereof to re-calibrate the camera module 200.

Figure 4:
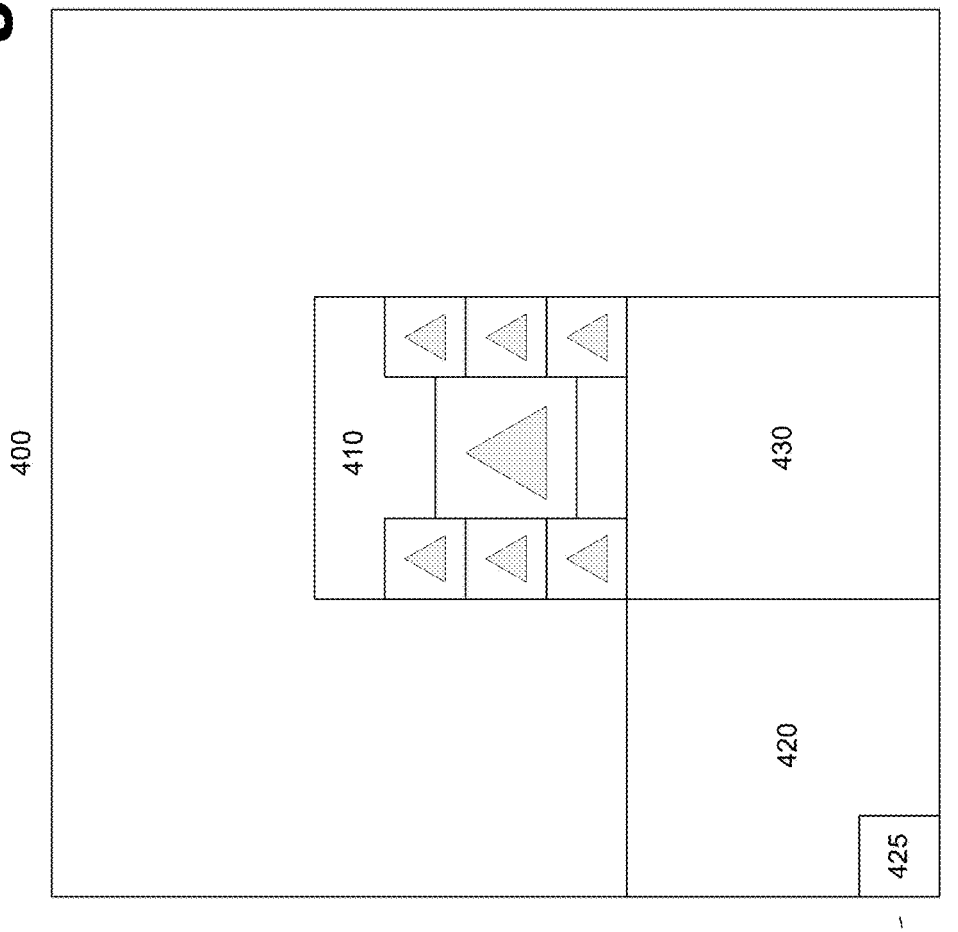
FIG. 4 is a block diagram of a tracking module of the camera tracking system illustrated in FIG. 1.

Referring now to FIG. 4, the tracking module 400 comprises a coordinate determination device 410, a tracking microcontroller 420 with a wireless communication interface 425, and a rechargeable battery 430. At regular time intervals, the coordinate determination device 410 measures one or more quantities of the tracking module 400 with respect to each of at least two axes. The quantities measured by the coordinate determination device 410 include at least one of the position, the velocity, and the acceleration of the tracking module, and in particular embodiments the type of instrument comprised by the coordinate determination device 410 may be selected based on the quantities to be measured. By way of non-limiting example, the coordinate determination device 410 may comprise an accelerometer to measure acceleration, as illustrated in FIG. 4, or a magnetometer to measure changes in position relative to a reference axis. The tracking microcontroller 420 transmits the quantities measured by the coordinate determination device as the coordinate information signal 499 via the wireless communication interface 425. The rechargeable battery 430 powers the coordinate determination device 410 and the tracking microcontroller 420. The tracking module 400 may be disposed on a wearable worn by a target object. By way of non-limiting example, the target object may be an athlete involved in a sporting contest, and the tracking module 400 may be disposed on the athlete's uniform, person, or equipment. Alternatively, and further by way of non-limiting example, the tracking module 400 may be disposed within or on a surface of a game projectile for the purpose of making it easier for a television viewer of a sporting event to see and follow the movement of the game projectile. Although not illustrated in FIG. 4, the tracking module 400 may further comprise a beacon, adapted to transmit a beacon signal by light and/or sound, which may be detected and interpreted by the camera microcontroller 230 as a prompt to re-initialize the camera tracking system 100 to eliminate accumulated error in the calculated target coordinates, or which may be used by the camera tracking system 100 in a similar manner as the coordinate information system 499 as a secondary means of coordinate determination. The beacon signal may be transmitted either periodically or continuously. It may also be possible to communicate the coordinate information signal 499 directly to the smartphone 320 and/or for the smartphone 320 to receive the beacon signal transmitted by the tracking module 400.

In some embodiments, the camera tracking system 100 may comprise multiple tracking modules 400. The coordinate determination device 410 of each of the multiple tracking modules 400 may measure both absolute quantities and quantities relative to the other tracking modules 400. In some of these embodiments, each of the multiple tracking modules 400 may be disposed on a different target object. By way of non-limiting example, the system may comprise three tracking modules 400, with two tracking modules disposed on the uniform, person, or equipment of each of two athletes and the third tracking module disposed on a game projectile.

In further embodiments, the application 310 may allow the user to command the camera module 200 to track a different one of multiple tracking modules 400 via the control signal 399. In these embodiments, each of the multiple tracking modules 400 may correspond to one of multiple target objects. Thus, the camera microcontroller 230 may receive multiple coordinate information signals 499, corresponding to multiple target objects, simultaneously, and may command the servo motor 220 to reorient the camera 210 such that the camera 210 remains focused on target coordinates corresponding to a particular one of the target objects at all times. When the camera microcontroller 230 receives a command to track a different tracking module 400 via the control signal 399, the camera microcontroller 230 may command the servo motor 220 to reorient the camera 210 such that the camera 210 changes its focus from a first set of target coordinates to a second set of target coordinates. By way of non-limiting example, the user may be able to command the camera module 200 to cease tracking a tracking module 400 disposed on the uniform, person, or equipment of an athlete and begin tracking a tracking module 400 disposed on a game projectile.

Figure 5:
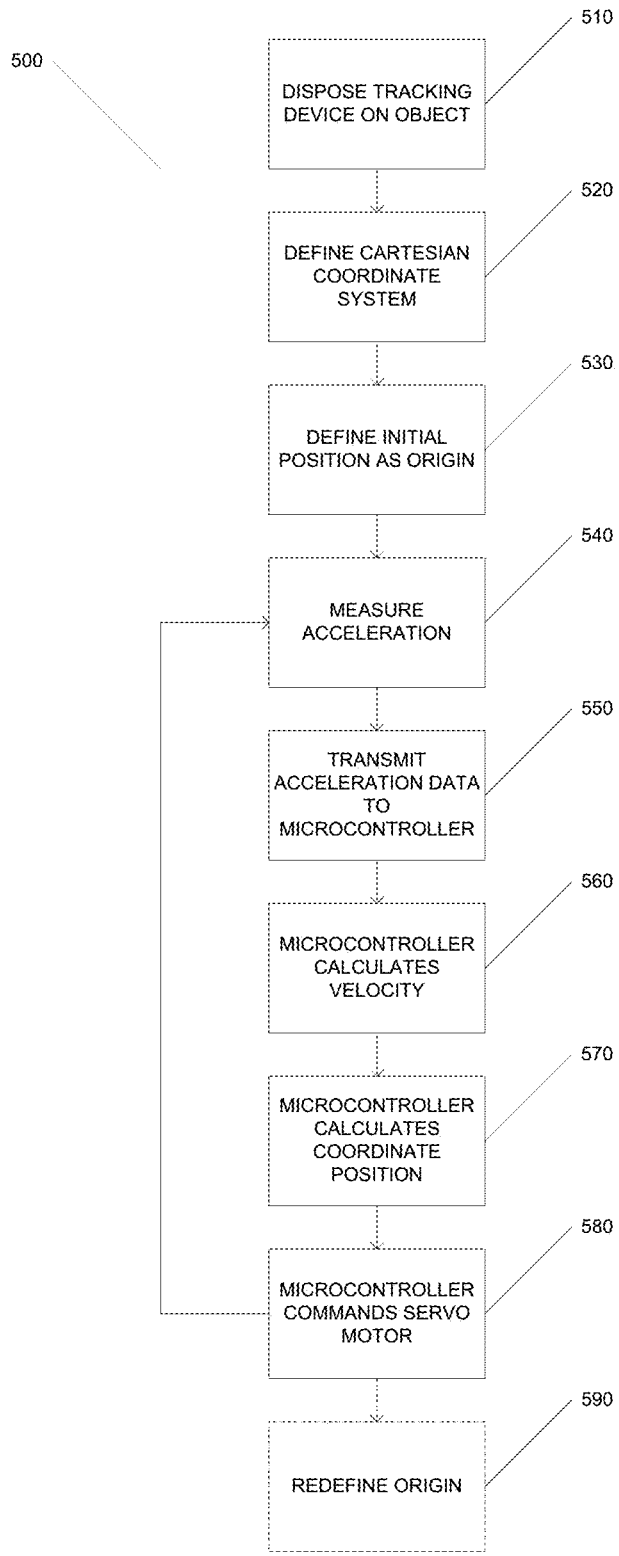
FIG. 5 is a flow diagram of a method for continuously tracking an object with a camera according to embodiments of the present disclosure.

Referring now to FIG. 5, a method 500 for continuously tracking an object with a camera comprises a disposing step 510, a coordinate system defining step 520, an origin defining step 530, a measuring step 540, a transmitting step 550, a velocity calculating step 560, a coordinate calculating step 570, and a commanding step 580. The measuring step 540, the transmitting step 550, the velocity calculating step 560, the coordinate calculating step 570, and the commanding step 580 are repeated after each of n time intervals of length $t_{int}$ elapse. In embodiments, $t_{int}$ may be selected to optimize the suitability of the method for a particular use, e.g. by selecting shorter $t_{int}$ when the target object moves or acts rapidly or when the camera is a high-frame rate camera, as may be understood by those of ordinary skill in the art. By way of non-limiting example, recording for conventional television broadcasts with a frame rate of 24 fps may require a $t_{int}$ of no more than $\frac{1}{24}$ second, or about 42 milliseconds, while high-speed recording for sporting events, scientific investigation of rapid natural phenomena, and the like may call for $t_{int}$ to be about 1 millisecond or less. Systems and equipment suitable for practicing the method of the present disclosure are available to practice the method with either of these $t_{int}$ values or any $t_{int}$ values therebetween, as well as $t_{int}$ values less than and more than these values. In particular embodiments, $t_{int}$ may be about 1 millisecond, or about 2.5 milliseconds. A practitioner of the method of this disclosure, being of ordinary skill in the art, will be able to select an appropriate value of n on the basis of $t_{int}$ and the length of the time the practitioner wishes to track the object with the camera.

In the disposing step 510, a tracking target comprising an accelerometer and a wireless transmitter is disposed on or within the object. In the coordinate system defining step 520, a Cartesian coordinate system having three dimensions x, y, z is defined. In the origin defining step 530, the position ($x_0$, $y_0$, $z_0$) of the tracking target at a start time $t_0$ defines the origin (0, 0, 0) of the coordinate system. In the measuring step 540, the accelerometer of the tracking target measures an acceleration along each of the three dimensions $a_{x,n}$, $a_{y,n}$, $a_{z,n}$ of the tracking target relative to the origin. In the transmitting step 550, the wireless transmitter of the tracking target transmits the accelerations $a_{x,n}$, $a_{y,n}$, $a_{z,n}$ to a microcontroller associated with the camera. In the velocity calculating step 560, the microcontroller calculates a velocity along each of the three dimensions $v_{x,n}$, $v_{y,n}$, $v_{z,n}$ of the tracking target relative to the origin, according to the equations:

$$v_{x,n} = v_{x,n-1} a_{x,n} t_{int}$$

$$v_{y,n} = v_{y,n-1} + a_{y,n} t_{int}$$

$$v_{z,n} = v_{z,n-1} a_{z,n} t_{int}$$

In the coordinate calculating step 570, the microcontroller calculates a coordinate position ($x_n$, $y_n$, $z_n$) of the tracking target according to the equations:

$$x_n = x_{n-1} + v_{x,n} t_{int} + \frac{a_{x,n} t_{int}^2}{2}$$

$$y_n = y_{n-1} + v_{y,n} t_{int} + \frac{a_{y,n} t_{int}^2}{2}$$

$$z_n = z_{n-1} + v_{z,n} t_{int} + \frac{a_{z,n} t_{int}^2}{2}$$

In the commanding step 580, the microcontroller commands at least one servo motor controlling the orientation of the camera to reorient the camera such that the camera is focused on the coordinate position of the tracking target. In embodiments, the method may also comprise an origin redefining step 590 after a preselected number of time intervals to eliminate accumulated error in the calculations. The redefining step 590 may be accomplished by the tracking target emitting a beacon signal and the microcontroller detecting the beacon signal and defining the origin as the coordinate position of the tracking target when the tracking target emitted the beacon signal. The beacon signal may comprise at least one of a light signal and a sound signal. In embodiments, the tracking target may be part of a wearable worn by the target object, or the target object may be a game projectile.

The disclosure illustratively disclosed herein suitably may be practiced in the absence of any element which is not specifically disclosed herein. It is apparent to those skilled in the art, however, that many changes, variations, modifications, other uses, and applications of the disclosure are possible, and also changes, variations, modifications, other uses, and applications which do not depart from the spirit and scope of the disclosure are deemed to be covered by the invention, which is limited only by the claims which follow.

The foregoing discussion of the disclosure has been presented for purposes of illustration and description. The foregoing is not intended to limit the disclosure to the form or forms disclosed herein. In the foregoing Detailed Description of the Invention, for example, various features of the disclosure are grouped together in one or more embodiments for the purpose of streamlining the disclosure. The features of the embodiments of the disclosure may be combined in alternate embodiments other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the disclosure has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

What is claimed is:

1. A camera tracking system, comprising:
a camera module, comprising:
a camera;
at least one servo motor, controlling an orientation of the camera; and
a camera microcontroller with a wireless communication interface, controlling the at least one servo motor;
a communications module, comprising an application for a user device, the application allowing a user of the system to initialize, activate, and deactivate the system; and
a tracking module, disposed on or within a target object, comprising:
a coordinate determination device, measuring one or more quantities of the tracking module with respect to each of at least two axes at regular time intervals, at least one of the quantities being selected from the group of position, velocity, and acceleration;
a tracking microcontroller with a wireless communication interface, transmitting coordinate information to the camera microcontroller via a wireless signal, the coordinate information comprising the quantities measured by the coordinate determination device; and
a rechargeable battery, powering the coordinate determination device and the tracking microcontroller;
wherein the camera microcontroller converts the coordinate information into target coordinates and commands the at least one servo motor to reorient the camera such that the camera remains focused on the target coordinates at all times during operation of the system and wherein the tracking module is further configured to determine that an accumulated error in the target coordinates has exceeded a predetermined threshold and, in response thereto, prompts the user to re-calibrate the camera module, wherein the tracking module is further configured to determine an accumulated error in the target coordinates has exceeded a predetermined threshold and, in response thereto, prompts the user to re-calibrate the camera module, wherein the application reminds the user to re-initial the system at preselected time intervals and wherein re-initializing the system comprises initiating on an origin redefining process after the preselected time interval so as to eliminate the accumulated error in the target coordinates.

2. The system of claim 1, wherein the camera microcontroller transmits images captured by the camera to the user device, and the application allows the user to view the images in real time.

3. The system of claim 1, wherein the application monitors a signal strength of the wireless signal.

4. The system of claim 1, wherein the tracking module is part of a wearable worn by the target object.

5. The system of claim 1, wherein the tracking microcontroller transmits a beacon signal at least at preselected time intervals.

6. The system of claim 5, wherein the beacon signal is at least one of one of a light signal and a sound signal.

7. The system of claim 5, wherein the system is re-initialized when the camera microcontroller detects the beacon signal.

8. The system of claim 5, wherein the tracking microcontroller transmits the beacon signal continuously.

9. The system of claim 1, further comprising a second tracking module, wherein the quantities measured by the coordinate determination devices of each of the tracking modules comprise both absolute quantities and quantities relative to the other tracking module.

10. The system of claim 1, wherein the coordinate determination device comprises an accelerometer and at least one of the quantities is acceleration.

11. The system of claim 1, wherein the coordinate determination device comprises a magnetometer and measures at least one of the quantities relative to a reference direction of the magnetometer.

12. The system of claim 1, wherein the coordinate determination device measures the quantities with respect to a first axis and a second axis only, and the target coordinates comprise a preselected fixed value along a third axis.

13. The system of claim 1, wherein the tracking module is disposed within, or on a surface of, a game projectile.

14. A method of maintaining an object within a viewable objective of a camera, comprising: providing the object with at least one tracking module that communicates information regarding a position of the at least one tracking module to a camera module; enabling the at least one tracking module to analyze the movement of the tracking module in at least two directions for a predetermined time interval; wirelessly communicating information regarding the movement of the at least one tracking module to the camera module; controlling a position of the camera in accordance with the information regarding the movement of the least one tracking module; determining that an accumulated error in the position of the at least one tracking module has exceeded a predetermined threshold; and prompting a user of the camera module to re-calibrate the camera module in response to determining that the accumulated error in the position of the at least one tracking module has exceeded the predetermined threshold; wherein the user is reminded to re-initialize the tracking module at preselected time intervals, and wherein re-initializing the tracking module comprising initiating an origin defining process after the preselected time interval so as to eliminate the accumulated error in the position of the at least one tracking module.

15. The method of claim 14, further comprising:
transmitting images captured by the camera to a user device operated by the user thereby allowing the user to view the images in real time.

16. The method of claim 14, further comprising:
monitoring a signal strength of a signal used to communicate the information regarding movement of the at least one tracking module to the camera module.

17. The method of claim 14, wherein the at least one tracking module analyzes the movement of itself in at least two directions by determining an acceleration of the tracking module.

18. The method of claim 14, wherein the at least one tracking module is disposed within, or on a surface of, a game projectile.

* * * * *